United States Patent
Chen et al.

(10) Patent No.: US 9,390,570 B1
(45) Date of Patent: Jul. 12, 2016

(54) VIRTUAL TOUCH-CONTROL LOCK

(71) Applicant: I-TEK METAL MFG. CO., LTD, Tainan (TW)

(72) Inventors: Po-Lung Chen, Tainan (TW); Yi-Cheng Chen, New Taipei (TW); Yao-Hui Lee, Tainan (TW)

(73) Assignee: I-Tek Metal Mfg. Co., Ltd., Tainan (TW)

( * ) Notice: Subject to any disclaimer, the term of this patent is extended or adjusted under 35 U.S.C. 154(b) by 0 days.

(21) Appl. No.: 14/667,731

(22) Filed: Mar. 25, 2015

(51) Int. Cl.
*G07C 9/00* (2006.01)
*G06K 9/00* (2006.01)
*G08B 25/12* (2006.01)
*H04W 4/22* (2009.01)

(52) U.S. Cl.
CPC ........ *G07C 9/00174* (2013.01); *G06K 9/00422* (2013.01); *G08B 25/12* (2013.01); *H04W 4/22* (2013.01)

(58) Field of Classification Search
None
See application file for complete search history.

(56) References Cited

U.S. PATENT DOCUMENTS

| | | | | |
|---|---|---|---|---|
| 5,468,947 A * | 11/1995 | Danielson | ............. | G06F 1/1632 235/472.02 |
| 7,760,190 B2 * | 7/2010 | Yeh | ..................... | G06F 3/03547 345/173 |
| 7,768,503 B2 * | 8/2010 | Chiu | ....................... | G06F 3/044 345/156 |
| 7,886,236 B2 * | 2/2011 | Kolmykov-Zotov | .................. | G06F 3/04883 715/856 |
| 9,196,104 B2 * | 11/2015 | Dumas | ............... | G07C 9/00571 |
| 2014/0298430 A1 * | 10/2014 | Tomasik | ................. | G06F 21/36 726/5 |
| 2015/0077371 A1 * | 3/2015 | Yeh | ....................... | G06F 3/0484 345/173 |
| 2016/0042581 A1 * | 2/2016 | Ku | ..................... | G07C 9/00309 340/5.61 |

\* cited by examiner

*Primary Examiner* — Brian Miller
(74) *Attorney, Agent, or Firm* — Alan D. Kamrath; Kamrath IP Lawfirm, P.A.

(57) ABSTRACT

A virtual touch-control lock includes a processing module electrically connected to a latch device. A storage module, at least one image pick up device, and an input platform including a transparent or non-transparent non-touch-control screen are electrically connected to the processing module. The input platform is configured to permit a user to proceed with handwriting on the input platform and/or touching the input platform. The at least one image pick up device picks up a handwriting trace of the handwriting and/or the touching sequence. The handwriting trace and/or the touching sequence is transmitted to the processing module and is compared with authorized door-opening identification information stored in the storage module. The identification result is used to control movement of a latch of the latch device from the latching position to the unlatching position or to permit the latch to move from the latching position to the unlatching position.

8 Claims, 2 Drawing Sheets

US 9,390,570 B1

VIRTUAL TOUCH-CONTROL LOCK

BACKGROUND OF THE INVENTION

The present invention relates to a virtual touch-control lock and, more particularly, to a virtual touch-control lock using a transparent or non-transparent input platform of a non-touch-control screen as an input interface and cooperating with at least one image pick up device for picking up images to permit unlocking control of a lock through handwriting on or touching the transparent or non-transparent input platform.

Conventional mechanical locks have been well developed, and metal keys are generally required to open most types of the mechanical locks, such that many people have to carry various keys for different locks and have to remember the corresponding lock of each key, which is inconvenient in carriage and use. With the progress of technology, conventional mechanical locks have been gradually developed to include motors or magnetically driven devices to activate the components of the locks, while cooperating electrical identity identification processes control locking or unlocking of the locks.

One type of the most commonly used electric locks uses radio frequency identification (RFID) technology to identify the identity of the user. Specifically, when the user carrying an induction card is near the electric lock, the electric lock reads an identification number stored in the induction card and compares the identification number of the induction card with a list of authorized identification numbers stored in the electric lock. If the identification number of the induction card matches any one of the authorized identification numbers, the electric lock is unlocked. On the other hand, if the identification number of the induction card does not match any one of authorized identification numbers, the electric lock remains locked. It is obvious that the electric lock remains locked if the user is without an induction card. Since the electric lock using RFID may require remote control (and is, thus, more suitable for public areas) and since the control of authorization or cancellation of the authorization of the induction card is complicated, the electric lock using RFID is not suitable for houses or non-public areas.

Furthermore, operation of electric locks requires electricity. Taking a door lock using RFID as an example, since the door can pivot, it is not easy to directly use the main power supply as the power source for the RFID door lock. Thus, a battery is mounted in the door lock to provide electricity to the RFID door lock. However, the RFID door lock intermittently emits signals to detect whether an induction card is nearby, such that the battery power could not support long-term operation of the RFID door lock without replacement of the battery.

Furthermore, locks, which are generally used against burglary, cannot generate an alarm signal while the locks are being destroyed by thieves, such as by using a hammer, such that the users cannot know the locks are being destroyed.

BRIEF SUMMARY OF THE INVENTION

To fix the above problems, the present invention provides a virtual touch-control lock including a latch device having a latch movable between a latching position and an unlatching position. The latch device further includes a driving member connected to the latch. The driving member can be operated to move the latch between the latching position and the unlatching position or to permit the latch to move between the latching position and the unlatching position. A processing module is electrically connected to the driving member and controls operation of the driving member. A storage module is electrically connected to the processing module. Authorized door-opening identification information including at least one of a handwriting trace and a touching sequence is stored in the storage module. A first image pick up device is electrically connected to the processing module. An input platform including a transparent or non-transparent non-touch-control screen is mounted outside of the first image pick up device. The input platform is configured to permit a user to proceed with at least one of handwriting on the input platform and touching the input platform. A power supply unit is electrically connected to the processing module and provides electricity to the processing module during operation. The power supply unit provides electricity required for operation of the driving member, the storage module, and the first image pick up device under control of the processing module.

When a user proceeds with at least one of handwriting on the input platform and touching the input platform, the first image pick up device picks up a handwriting trace of the handwriting and/or a touching sequence of the touching and transmits the handwriting trace and/or the touching sequence to the processing module. The processing module compares the handwriting trace and/or the touching sequence inputted from the first image pick up device with the authorized door-opening identification information stored in the storage module.

When the latch is in the latching position, if the handwriting trace and/or the touching sequence inputted from the first image pick up device does not match the authorized door-opening identification information stored in the storage module, the driving member is not activated, and the latch remains in the latching position.

When the latch is in the latching position, if the handwriting trace and/or the touching sequence inputted from the first image pick up device matches the authorized door-opening identification information stored in the storage module, the driving member is activated to move the latch from the latching position to the unlatching position or to permit the latch to move from the latching position to the unlatching position.

The virtual touch-control lock can further include an awakening module electrically connected to the processing module. The power supply, unit provides electricity required for operation of the awakening module under control of the processing module. The awakening module is adapted to detect whether a person is near the input platform. When the awakening module detects that nobody is near the input platform, the processing module controls the first image pick up device to stop. On the other hand, when the awakening module detects that a person is near the input platform, the processing module controls the first image pick up device to operate.

The virtual touch-control lock can further include a second image pick up device electrically connected to the processing module. When the awakening module detects that nobody is near the input platform, the processing module controls the first and second image pick up devices to stop. On the other hand, when the awakening module detects that a person is near the input platform, the processing module controls the first and second image pick up devices to operate.

The virtual touch-control lock can further include an inertia detecting unit and an alarm module. The inertia detecting unit is electrically connected to the processing module. The power supply unit provides electricity required for operation of the inertia detecting unit under control of the processing module. The alarm module is electrically connected to the processing module. The power supply unit provides electricity required for operation of the alarm module under control of the processing module. When the awakening module detects that nobody is near the input platform, the processing module controls the inertia detecting unit to stop. On the other hand, when the awakening module detects that a person is near the input platform, the processing module controls the inertia detecting unit to operate. When the inertia detecting unit detects vibrations of the virtual touch-control lock, the inertia detecting unit outputs a signal to the processing module to activate the alarm module, and the alarm module generates an alarm message. On the other hand, when the inertia detecting unit detects no vibrations of the virtual touch-control lock, the inertia detecting unit does not output the signal to the processing module, and the alarm module is not activated.

The virtual touch-control lock can further include a light module mounted in the input platform and electrically connected to the processing module. When the awakening module detects that nobody is near the input platform, the processing module controls the light module to stop. On the other hand, when the awakening module detects that a person is near the input platform, the processing module controls the light module to illuminate the input platform.

The latch device is adapted to be mounted to a door. The power supply unit can be a battery. The virtual touch-control lock can further include a receiver and a transmitter. The receiver is electrically connected to the battery and is adapted to be mounted on the door. The transmitter is adapted to be electrically connected to the city power, is adapted to be mounted to a door frame to which the door is pivotably mounted, and is adapted to transmit a wireless signal. When the door is open, the receiver is outside of a signal range of the wireless signal of the transmitter, such that the receiver cannot charge the battery. When the door is closed, the receiver is within the signal range of the transmitter, such that the receiver converts the wireless signal from the transmitter into an electric current to charge the battery.

Each of the first and second image pick up devices can be mounted above the input platform and can be at an angle not equal to 90° to a surface of the input platform. Each of the first and second image pick up devices has a lens facing downwards.

The present invention will become clearer in light of the following detailed description of illustrative embodiments of this invention described in connection with the drawings.

Figure 1:
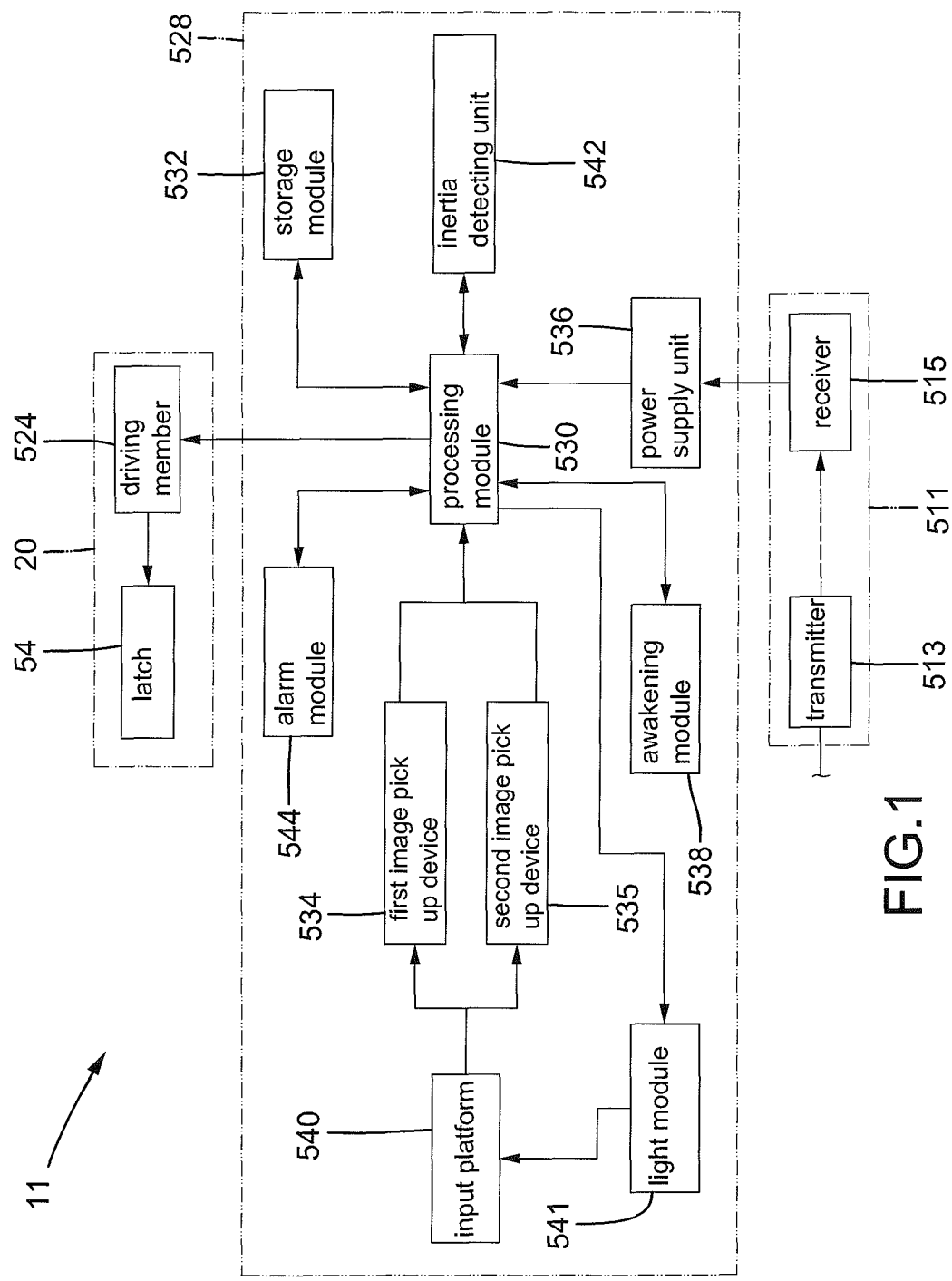
FIG. 1 is a block view of a virtual touch-control lock of an embodiment according to the present invention.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "side", "downwards", "above", "inside", "outside", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

Figure 2:
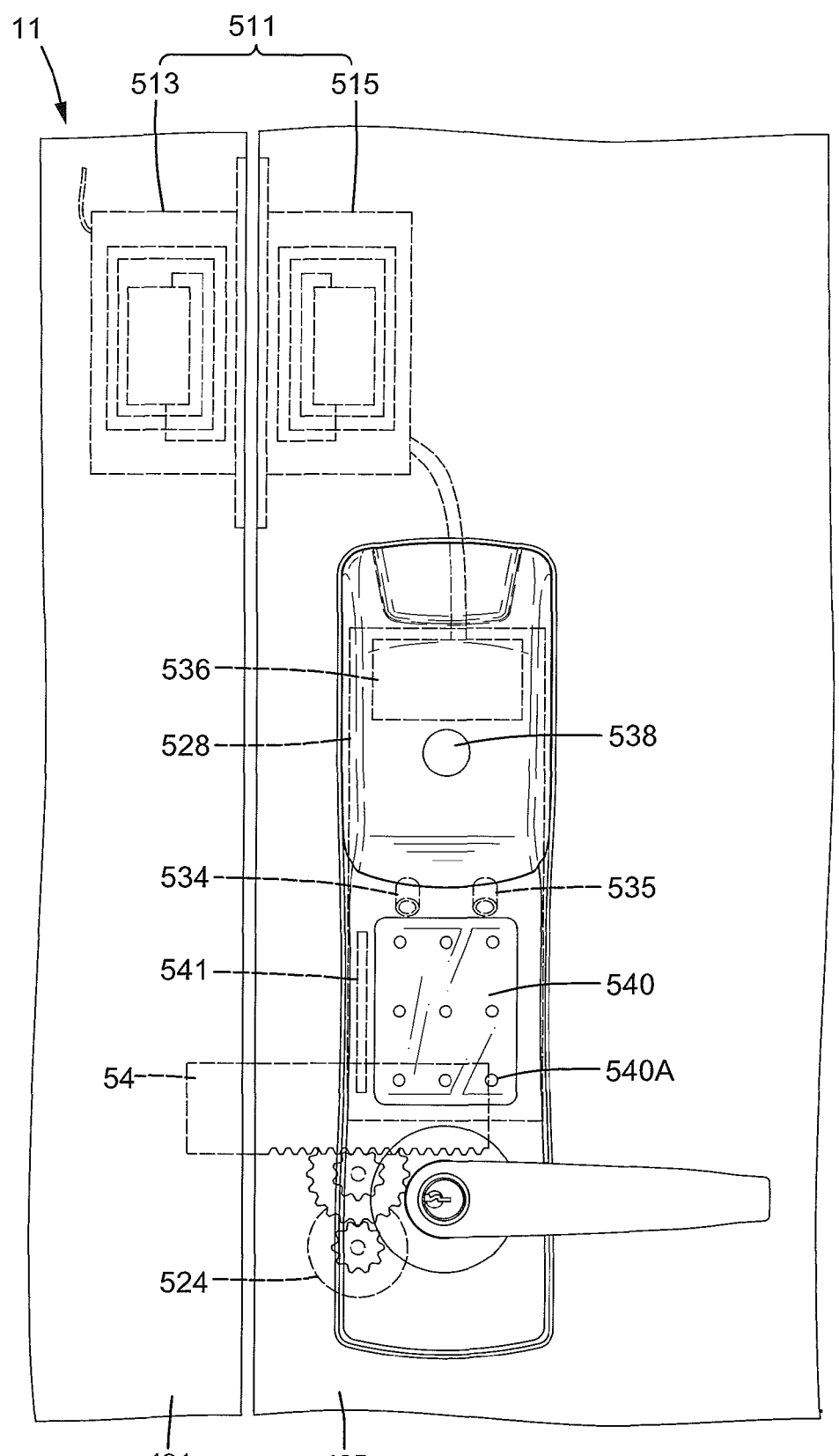
FIG. 2 is a partial, plan view of a door on which the virtual touch-control lock is mounted.

With reference to FIGS. 1-2, a virtual touch-control lock 11 of an embodiment according to the present invention is illustrated as a door lock mounted to a door 435. Specifically, in this embodiment, the virtual touch-control lock 11 includes a latch device 20 mounted to the door 435 and having a mechanical structure. The latch device 20 can be of any desired form as conventional including but not limited to of a commercially available type. The latch device 20 includes a latch 54 that can be controlled to move between a latching position at least partially outside of the door 435 and an unlatching position inside the door 435. The latch device 20 further includes a driving member 524 connected to the latch 54. In an example, the driving member 524 is comprised of a motor and a gear train between the motor and the latch 54 (see FIG. 2). The latch 54 includes a rack meshed with the gear train. Thus, the latch 54 moves between the latching position and the unlatching position when the driving member 524 operates.

In this embodiment, the virtual touch-control lock 11 further includes a virtual touch-control device 528 electrically connected to the driving member 524 of the latch device 20. The virtual touch-control device 528 includes a processing module 530 electrically connected to the driving member 524. The processing module 530 controls operation of the driving member 524. The virtual touch-control device 528 further includes a storage module 532 electrically connected to the processing module 530. Authorized door-opening identification information including at least one of a handwriting trace and a touching sequence is stored in the storage module 532.

In this embodiment, the virtual touch-control device 528 further includes first and second image pick up devices 534 and 535 electrically connected to the processing module 530. The first and second image pick up devices 534 and 535 are connected in parallel. The virtual touch-control device 528 further includes an awakening module 538 electrically connected to the processing module 530. The awakening module 538 is adapted to detect whether a person is near the virtual touch-control lock 1*t*. In an example, the awakening module 538 can use an infrared light source and an optical sensor. When nobody is near the virtual touch-control lock 11, the infrared ray will not be reflected to the optical sensor. When the awakening module 538 detects that nobody is near the virtual touch-control lock 11, the processing module 530 controls the first and second image pick up devices 534 and 535 to stop. On the other hand, the awakening module 538 detects that a person is near the virtual touch-control lock 11, the processing module 530 controls the first and second image pick up devices 534 and 535 to operate.

In this embodiment, the virtual touch-control device 528 further includes an input platform 540 including a transparent or non-transparent non-touch-control screen, such as a light guiding board. The input platform 540 includes an outer surface having a plurality of marks 540A. The input platform 540 is mounted outside of the first and second image pick up devices 534 and 535. Each of the first and second image pick up devices 534 and 535 is mounted above the input platform 540 and is at an angle not equal to 90° to the outer surface of the input platform 540, such that each of the first and second image pick up devices 534 and 535 can pick up the image of the whole input platform 540. Each of the first and second image pick up devices 534 and 535 has a lens facing downwards and facing the input platform 540.

In this embodiment, a light module 541 is mounted at a side of the input platform 540 and is electrically connected to the processing module 530. When the awakening module 538 detects that a person is near the input platform 540, the processing module 530 controls the light module 541 to illuminate the input platform 540. On the other hand, when the awakening module 538 detects that nobody is near the input platform 540, the processing module 530 controls the light module 541 to stop.

The input platform 540 is configured to permit a user to proceed with at least one of handwriting on the input platform 540 and touching the input platform 540. Handwriting includes movement of a finger that keeps touching the input platform 540 to draw a figure, a symbol, a letter, etc. The marks 540A serve as reference points for the movement of the finger. As an example, a trace that can more easily be identified by the processing module 530 can be generated in a specific area of the input platform 540 after the finger touches any, one of the marks 540A and then moves on the input platform 540 to another mark 540A. Thus, the first and second image pick up devices 534 and 535 can pick up the images of the trace resulting from the handwriting.

Touching includes using a finger to touch any one of the marks 540A on the input platform 540, moving the finger away from the input platform 540, and then touching another mark 540A. The finger can touch the same or different marks 540A several times. The first and second image pick up devices 534 and 535 pick up the images of the touching sequence of the marks 540A.

In addition to providing a light source to indicate the position of the input platform 540 and to provide illumination for the user, the light module 541 also provide sufficient luminance for the first and second image pick up devices 534 and 535. Thus, the first and second image pick up devices 534 and 535 can obtain high quality images of the handwriting trace and/or the touching sequence, improving the identification success rate of the processing module 530.

In this embodiment, the virtual touch-control device 528 further includes an inertia detecting unit 542 electrically connected to the processing module 530 and an alarm module 544, such as a buzzer, electrically connected to the processing module 530. The inertia detecting unit 542 can include a digital three-axis accelerator. The inertia detecting unit 542 is used to detection vibrations of the virtual touch-control lock 11 for the purposes of identifying whether a burglar is destroying the virtual touch-control lock 11. When the inertia detecting unit 542 detects vibrations of the virtual touch-control lock 11, the inertia detecting unit 542 outputs a signal to the processing module 530 to activate the alarm module 544, and the alarm module 544 generates an alarm message, such as a siren.

In this embodiment, the virtual touch-control device 528 further includes a power supply unit 536 electrically connected to the processing module 530. The power supply unit 2536 can be a battery. The power supply unit 536 provides electricity required for operation of the first and second image pick up devices 534 and 535, the awakening module 538, the inertia detecting unit 542, the storage module 532, the light module 541, and the driving member 524 under control of the processing module 530.

In this embodiment, the virtual touch-control lock 11 further includes a wireless charging device 511. The wireless charging device 511 includes a receiver 515 electrically connected to the power supply unit 536. The receiver 515 is adapted to be mounted to the door 435, such as mounted inside the door 435. The wireless charging device 511 further includes a transmitter 513 adapted to be electrically connected to the city power, adapted to be mounted to a door frame 491 to which the door 435 is pivotably mounted, and adapted to transmit a wireless signal. When the door 435 is open, the receiver 515 is outside of a signal range of the wireless signal. On the other hand, when the door 435 is closed, the receiver 515 is within the signal range of the transmitter 513.

Now that the basic construction of the virtual touch-control lock 11 has been explained, the operation and some of the advantages of the virtual touch-control lock 11 can be set forth and appreciated. In particular, for the sake of explanation, it will be assumed that the door 435 is closed and the latch 54 is in the latching position. Since the receiver 515 is within the signal range of the transmitter 513, the receiver 515 converts the wireless signal from the transmitter 513 into an electric current to charge the power supply unit 536. The latch 54 in the latching position is engaged in a receptacle in the door frame 491 to prevent opening of the door 435.

With the door 435 in the closed state, when the awakening module 538 detects that nobody is near the input platform 540, the processing module 530 controls the first and second image pick up devices 534 and 535, the light module 541, and the inertia detecting unit 542 to stop, thereby saving electricity. Furthermore, when the awakening module 538 detects that nobody is near the virtual touch-control lock 11, the processing module 530 can control the storage module 532, the inertia detecting unit 542, and the alarm module 544 to stop, further saving electricity. Note that even if the awakening module 538 detects that nobody is near the virtual touch-control lock 11, the processing module 530 still controls the power supply unit 536 to supply electricity to the awakening module 538, such that the awakening module 538 can continuously detect whether a person is near the virtual touch-control lock 11.

When the door 435 is in the closed state, if the awakening module 538 detects that a person is near the input platform 540, the processing module 530 controls the first and second image pick up devices 534 and 535, the light module 541, and the inertia detecting unit 542 to operate. The light module 541 illuminates the input platform 540. The first and second image pick up devices 534 and 535 start the image pick up operation. The inertia detecting unit 542 detects whether abnormal vibrations of the virtual touch-control lock 11 occur to identify whether the virtual touch-control lock 11 is being destroyed. If the inertia detecting unit 542 detects abnormal vibration, the alarm device 544 is activated to generate an alarm message.

On the other hand, if the inertia detecting unit 542 detects no abnormal vibrations of the virtual touch-control lock 11, the alarm module 544 is not activated. The first and second image pick up devices 534 and 535 pick up the handwriting trace of the handwriting and/or the touching sequence of the touching and transmit the handwriting trace and/or the touching sequence to the processing module 530. The processing module 530 compares the handwriting trace and/or the touching sequence inputted from the first and second image pick up devices 534 and 535 with the authorized door-opening identification information stored in the storage module 532.

If the processing module 530 identifies that the handwriting trace and/or the touching sequence inputted from the first and second image pick up devices 534 and 535 does not match the authorized door-opening identification information stored in the storage module 532, the driving member 524 is not activated, and the latch 54 remains in the latching position not permitting opening of the door 435.

On the other hand, if the processing module 530 identifies that the handwriting trace and/or the touching sequence inputted from the first and second image pick up devices 534 and 535 matches the authorized door-opening identification information stored in the storage module 532, the driving member 524 is activated to move the latch 54 from the latching position to the unlatching position, permitting opening of the door 435.

When the latch 54 is in the unlatching position and when the door 435 is opened, the receiver 515 is outside of the signal range of the wireless signal of the transmitter 513, such that the receiver 515 stops charging the power supply unit 536.

The virtual touch-control lock 11 uses the input platform 540 having a non-touch-control screen and the first and second image pick up devices 534 and 535 to achieve the handwriting function and the touch control function, avoiding use of expensive touch-control screens to save the manufacturing costs.

The virtual touch-control lock 11 uses the inertia detecting unit 542 to cooperate with the alarm module 544 and the awakening module 538 for detecting whether the person near the virtual touch-control lock 11 is destroying the virtual touch-control lock 11. Furthermore, the alarm module 544 is activated when the virtual touch-control lock 11 is being destroyed by an external force.

The virtual touch-control lock 11 uses the awakening module 538 to detect whether a person is near the virtual touch-control lock 11. In a case that nobody is near the virtual touch-control lock 11, the first and second image pick up devices 534 and 535, the light module 541, and the inertia detecting unit 542 stop operation to save electricity.

The virtual touch-control lock 11 uses the receiver 515 of the wireless charging device 511 to charge the power supply unit 536 when the door 435 is closed, greatly reducing the replacement frequency of the power supply unit 536.

Now that the basic teachings of the present invention have been explained, many extensions and variations will be obvious to one having ordinary skill in the art. For example, the virtual touch-control lock 11 does not have to include the second image pick up device 535. The first image pick up device 534 can be mounted to be perpendicular to the input platform 540 to pick up the handwriting trace and/or the touching sequence. Furthermore, the virtual touch-control lock 11 does not have to include the awakening module 538. In this case, the overall costs for the input platform 540 formed by a light guiding board and for the first and second image pick up devices 534 and 535 are still lower than the costs for a touch-control screen, although the first and second image pick up devices 534 and 535, the input platform 540, and the inertia detecting unit 542 keep consuming electricity.

Furthermore, although the driving member 524 in the form shown is directly connected to the latch 54 to move the latch 54 between the latching position and the unlatching position, operation of the driving member 524 does not have to actuate the latch 54. For example, the driving member 524 can be of a type movable between a first position not blocking movement of the latch 54 between the latching and unlatching positions and a second position blocking movement of the latch 54 between the latching and unlatching positions.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A virtual touch-control lock comprising:
   a latch device including a latch movable between a latching position and an unlatching position, with the latch device further including a driving member connected to the latch, and with the driving member operable to move the latch between the latching position and the unlatching position or to permit the latch to move between the latching position and the unlatching position;
   a processing module electrically connected to the driving member, with the processing module controlling operation of the driving member;
   a storage module electrically connected to the processing module, wherein authorized door-opening identification information including at least one of a handwriting trace and a touching sequence is stored in the storage module;
   a first image pick up device electrically connected to the processing module;
   an input platform including a transparent or non-transparent non-touch-control screen, with the input platform mounted outside of the first image pick up device, with the input platform configured to permit a user to proceed with at least one of handwriting on the input platform and touching the input platform; and
   a power supply unit electrically connected to the processing module and providing electricity to the processing module during operation, with the power supply unit providing electricity required for operation of the driving member, the storage module, and the first image pick up device under control of the processing module,
   wherein when a user proceeds with at least one of handwriting on the input platform and touching the input platform, the first image pick up device picks up a handwriting trace of the handwriting and/or a touching sequence of the touching and transmits the handwriting trace and/or the touching sequence to the processing module, and the processing module compares the handwriting trace and/or the touching sequence inputted from the first image pick up device with the authorized door-opening identification information stored in the storage module,
   wherein when the latch is in the latching position, if the handwriting trace and/or the touching sequence inputted from the first image pick up device does not match the authorized door-opening identification information stored in the storage module, the driving member is not activated, and the latch remains in the latching position, and
   wherein when the latch is in the latching position, if the handwriting trace and/or the touching sequence inputted from the first image pick up device matches the authorized door-opening identification information stored in the storage module, the driving member is activated to move the latch from the latching position to the unlatching position or to permit the latch to move from the latching position to the unlatching position.

2. The virtual touch-control lock as claimed in claim 1, further comprising:
   an awakening module electrically connected to the processing module, with the power supply unit providing electricity required for operation of the awakening module under control of the processing module, and with the awakening module adapted to detect whether a person is near the input platform, wherein when the awakening module detects that nobody is near the input platform, the processing module controls the first image pick up device to stop, and wherein when the awakening module detects that a person is near the input platform, the processing module controls the first image pick up device to operate.

3. The virtual touch-control lock as claimed in claim 2, further comprising a second image pick up device electrically connected to the processing module, wherein when the awakening module detects that nobody is near the input platform, the processing module controls the first and second image pick up devices to stop, and wherein when the awakening module detects that a person is near the input platform, the processing module controls the first and second image pick up devices to operate.

4. The virtual touch-control lock as claimed in claim 2, further comprising:

an inertia detecting unit electrically connected to the processing module, with the power supply unit providing electricity required for operation of the inertia detecting unit under control of the processing module;

an alarm module electrically connected to the processing module, with the power supply unit providing electricity required for operation of the alarm module under control of the processing module, wherein when the awakening module detects that nobody is near the input platform, the processing module controls the inertia detecting unit to stop, wherein when the awakening module detects that a person is near the input platform, the processing module controls the inertia detecting unit to operate, wherein when the inertia detecting unit detects vibrations of the virtual touch-control lock, the inertia detecting unit outputs a signal to the processing module to activate the alarm module, and the alarm module generates an alarm message, and wherein when the inertia detecting unit detects no vibrations of the virtual touch-control lock, the inertia detecting unit does not output the signal to the processing module, and the alarm module is not activated.

5. The virtual touch-control lock as claimed in claim 2, further comprising a light module mounted in the input platform and electrically connected to the processing module, wherein when the awakening module detects that nobody is near the input platform, the processing module controls the light module to stop, and wherein when the awakening module detects that a person is near the input platform, the processing module controls the light module to illuminate the input platform.

6. The virtual touch-control lock as claimed in claim 1, with the latch device adapted to be mounted to a door, with the power supply unit being a battery, with the virtual touch-control lock further comprising:

a receiver electrically connected to the battery, with the receiver adapted to be mounted on the door; and a transmitter adapted to be electrically connected to city power, with the transmitter adapted to be mounted to a door frame to which the door is pivotably mounted, and with the transmitter adapted to transmit a wireless signal, wherein when the door is open, the receiver is outside of a signal range of the wireless signal of the transmitter, such that the receiver cannot charge the battery, and wherein when the door is closed, the receiver is within the signal range of the transmitter, such that the receiver converts the wireless signal from the transmitter into an electric current to charge the battery.

7. The virtual touch-control lock as claimed in claim 1, further comprising:

a second image pick up device electrically connected to the processing module, wherein when the user proceeds with at least one of handwriting on the input platform and touching the input platform, the first and second image pick up devices pick up the handwriting trace of the handwriting and/or the touching sequence of the touching and transmit the handwriting trace and/or the touching sequence to the processing module, and the processing module compares the handwriting trace and/or the touching sequence inputted from the first and second image pick up devices with the authorized door-opening identification information stored in the storage module, wherein when the latch is in the latching position, if the handwriting trace and/or the touching sequence inputted from the first and second image pick up devices does not match the authorized door-opening identification information stored in the storage module, the driving member is not activated, and the latch remains in the latching position, and wherein when the latch is in the latching position, if the handwriting trace and/or the touching sequence inputted from the first and second image pick up devices matches the authorized door-opening identification information stored in the storage module, the driving member is activated to move the latch from the latching position to the unlatching position or to permit the latch to move from the latching position to the unlatching position.

8. The virtual touch-control lock as claimed in claim 7, wherein each of the first and second image pick up devices is mounted above the input platform and is at an angle not equal to 90° to a surface of the input platform, and each of the first and second image pick up devices has a lens facing downwards.

* * * * *